United States Patent
Morehead (10) Patent No.: US 10,518,861 B2
(45) Date of Patent: Dec. 31, 2019

(54) CONTINUOUS FIBER REINFORCEMENT FOR AIRSHIP CONSTRUCTION

(71) Applicant: Lockheed Martin Corporation, Bethesda, MD (US)

(72) Inventor: John P. Morehead, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 527 days.

(21) Appl. No.: 15/342,821

(22) Filed: Nov. 3, 2016

(65) Prior Publication Data

US 2018/0118320 A1    May 3, 2018

(51) Int. Cl.
| | |
|---|---|
| B64B 1/58 | (2006.01) |
| B05D 1/02 | (2006.01) |
| B29C 70/30 | (2006.01) |
| B64B 1/02 | (2006.01) |
| B29L 31/30 | (2006.01) |

(52) U.S. Cl.
CPC .......... B64B 1/58 (2013.01); B05D 1/02 (2013.01); B29C 70/30 (2013.01); B64B 1/02 (2013.01); *B29L 2031/307* (2013.01); *B64B 2201/00* (2013.01)

(58) Field of Classification Search
CPC .. B29C 53/56; B64B 1/02; B64B 1/14; B29L 2031/307
See application file for complete search history.

(56) References Cited

U.S. PATENT DOCUMENTS

| | | | |
|---|---|---|---|
| 997,496 | A | 7/1911 | Hafely |
| 1,528,122 | A | 3/1925 | Macmechen |
| 2,919,082 | A | 12/1959 | Winzen et al. |
| 3,311,328 | A | 3/1967 | Slater |
| 3,369,774 | A | 2/1968 | Struble, Jr. |
| 6,074,722 | A | 6/2000 | Cuccias |
| 6,655,253 | B2 | 12/2003 | Uchida et al. |
| 6,914,021 | B2 | 7/2005 | Sidwell |
| 8,616,111 | B2 | 12/2013 | Simpson |
| 9,114,236 | B2 | 8/2015 | Davies, Jr. et al. |
| 2002/0069750 | A1* | 6/2002 | Uchida ............... D04C 1/06 87/33 |
| 2006/0192048 | A1 | 8/2006 | Pedretti et al. |

(Continued)

FOREIGN PATENT DOCUMENTS

| | | |
|---|---|---|
| EP | 1 819 879 | 8/2007 |
| JP | 07040894 A | 2/1995 |
| JP | 2003103675 A | 4/2003 |

OTHER PUBLICATIONS

Extended European Search Report from the European Patent Office in Application No. 17199570.7-1754, dated Dec. 19, 2017, 8 pages.

*Primary Examiner* — Philip J Bonzell
*Assistant Examiner* — Tye William Abell
(74) *Attorney, Agent, or Firm* — Baker Botts L.L.P.

(57) ABSTRACT

An airship hull is disclosed. The airship hull comprises a gas-tight shape fabricated from a membrane. The airship hull comprises one or more fibers applied to an outer surface of the gas-tight shape in a continuous manner such that a particular one of the one or more fibers wraps around a circumference of the gas-tight shape multiple times, wherein the applied one or more fibers are affixed to the outer surface of the gas-tight shape.

15 Claims, 5 Drawing Sheets

(56) References Cited

U.S. PATENT DOCUMENTS

| | | | |
|---|---|---|---|
| 2006/0192054 A1 | 8/2006 | Lachenmeier | |
| 2007/0281570 A1 | 12/2007 | Liggett et al. | |
| 2011/0172698 A1* | 7/2011 | Davies, Jr. | A61M 25/1029 606/194 |
| 2013/0312895 A1* | 11/2013 | Morehead | B64F 5/40 156/64 |
| 2014/0158817 A1 | 6/2014 | Chambers | |
| 2014/0182738 A1* | 7/2014 | Simpson | A61M 25/10 139/11 |
| 2015/0174830 A1* | 6/2015 | Lee | B29C 53/56 206/524.3 |
| 2016/0083068 A1* | 3/2016 | Crites | B64B 1/14 244/31 |
| 2016/0121076 A1* | 5/2016 | Tilson | A61M 25/1027 606/194 |

* cited by examiner

CONTINUOUS FIBER REINFORCEMENT FOR AIRSHIP CONSTRUCTION

TECHNICAL FIELD

The present disclosure relates, in general, to airship construction and, more particularly, to continuous fiber reinforcement of airship construction.

BACKGROUND

Existing approaches to airship and aerostat construction rely on structural joints to transform flat materials into three-dimensional, gas-tight volumes. The overall strength of gas-filled hulls constructed using existing approaches is therefore limited by the strength of the individual structural joints. While great advancements have been made in the strength and weight of reinforced fabrics and laminates, bonded structural joints still rely on relatively weak adhesives and resins. This, in turn, results in joints that are large, heavy, and difficult to construct. Structural joints have been a weak point of high performance hulls, with no light-weight solution currently in use. Thus, there is a need for an improved method of constructing airships, aerostats, and other lighter-than-air craft that does not suffer from these deficiencies.

SUMMARY

According to embodiments of the present disclosure, disadvantages and problems associated with previous techniques for constructing airships, aerostats and other lighter-than-air craft may be reduced or eliminated.

According to one example embodiment, an airship hull is disclosed. The airship hull comprises a gas-filled shape fabricated from a membrane. The airship hull comprises one or more fibers applied to an outer surface of the gas-filled shape in a continuous manner such that a particular one of the one or more fibers wraps around a circumference of the gas-filled shape multiple times. The applied one or more fibers are: applied in a helical pattern, the helical pattern having a helical angle within a range of 40 degrees to 60 degrees when measured relative to a forward direction of the gas-filled shape; affixed to the outer surface of the gas-filled shape; and coated with one of a film or spray coating.

According to another example embodiment, a method for continuous fiber reinforcement of airship construction is disclosed. The method comprises fabricating a gas-filled shape from a membrane. The method comprises applying one or more fibers to an outer surface of the gas-filled shape in a continuous manner such that a particular one of the one or more fibers wraps around a circumference of the gas-filled shape multiple times. The method comprises affixing the applied one or more fibers to the outer surface of the gas-filled shape.

Certain embodiments of the present disclosure may provide one or more technical advantages. As one example, hulls constructed with continuous fiber reinforcement may be lighter than traditional designs. As another example, hulls constructed with continuous fiber reinforcement may be stronger than traditional designs. As still another example, hulls constructed with continuous fiber reinforcement may be easier to build than traditional designs. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, existing approaches to construction of airships, aerostats, and other lighter-than-air craft (referred to generally herein as airships) rely on structural joints to transform flat materials into three-dimensional, gas-tight volumes. These existing approaches, however, suffer from certain deficiencies. One such deficiency relates to the way in which the materials used to form the hulls of the craft are treated. For example, the material used to construct the hulls is often manufactured using weavers or looms using one or more kinds of fibers, which may run in multiple directions. The material constructed using the looms and weavers may then be run through a series of processes to laminate films onto the material and/or treat the material with different coatings. The end result is a material that is very strong, gas-tight (e.g., to helium leakage) and resistant to sunlight, rain and other elements.

During construction of airship hulls, however, this material is cut into pieces (commonly referred to as gores) based on the desired shape of the airship hull being constructed. As noted above, the material coming off of the looms is formed from very strong fibers. In cases where the fibers themselves are extremely strong, it is desirable for them to be continuous. Cutting the material into gores therefore degrades the structural integrity of the material. As the gore pieces are joined to make a three-dimensional shape, the gore pieces are joined together through processes such as welding (often using a strip of the same material as the gores). These structural joints (i.e., the seam where two gore pieces are joined together) limit the overall strength of the airships being constructed, and rely on relatively weak adhesives or resins. Moreover, the structural joints required by existing approaches are large (often running from the nose to the tail of the airship, which can be hundreds of feet long), heavy, and difficult to construct.

In addition to the decreased strength caused by cutting the material to form the individual gore pieces, the process of assembling the airship hull according to existing approaches has further deleterious effects on the material. As noted above, the individual gore pieces must be joined together in order to form the final shape of the airship hull. Commonly, the gore pieces are joined together using a strip of material placed on top of the gore pieces at a seam and welded together (using, for example, heat welding or similar processes).

This approach suffers from a number of deficiencies. As an initial matter, the process itself is time consuming in that it requires a worker to weld the seams together foot-by-foot. Furthermore, during assembly of the gore pieces the material forming each piece is often simply laid on the floor. As more gore pieces are joined together, the developing hull can become large and difficult to handle. As a result, more workers are required to, for example, pick up edges of the material and move it across the floor and reposition the developing hull. This process can result in further damage to the material due to debris present on the floor as workers are folding, maneuvering, and even walking on the material. This can, among other things, degrade the ability of the material to retain gases due to the formation of small holes. Thus, once the gore pieces are joined together, the shape must be sealed and filled with a gas (such as air or helium), and the requisite quality checks must be performed to ensure that leaks are located and repaired. This further increases the amount of time and effort required to construct the final airship.

The present disclosure contemplates various embodiments that may address these and other deficiencies associated with existing approaches to airship construction. Compared to existing approaches, the various embodiments described herein improve on typical airship construction by eliminating structural joints through the use of continuous fiber reinforcement across the three-dimensional surface of the airship or aerostat hull. In certain embodiments, a membrane of thin film or fabric, built in the desired hull shape, is filled with gas and suspended above the floor. Reinforcement fibers are applied to the outer surface, for example using self-propelled fiber placement devices that travel on the membrane surface. The fibers may be applied in a helical manner. The reinforcement fibers are fixed to the underlying hull surface at both ends, for example using adhesive bonding or mechanical anchoring. In certain embodiments, the length of a single fiber is large enough to wrap around the circumference multiple times, effectively eliminating structural joints across the hull assembly.

According to one example embodiment, an airship hull is disclosed. The airship hull comprises a gas-filled shape fabricated from a membrane, and one or more fibers applied to an outer surface of the gas-filled shape in a continuous manner such that a particular one of the one or more fibers wraps around a circumference of the gas-filled shape multiple times. The applied one or more fibers may be applied in a helical pattern. In some cases, the helical pattern may have a helical angle within a range of 40 degrees to 60 degrees when measured relative to a forward direction of the gas-filled shape. The applied one or more fibers are affixed to the outer surface of the gas-filled shape, and coated with one of a film or spray coating. The applied one or more fibers may be affixed to the outer surface of the gas-tight shape by one or more of mechanical anchoring of the one or more fibers to an end of the gas-filled shape and using adhesive.

According to another example embodiment, a method for continuous fiber reinforcement of airship construction is disclosed. In certain embodiments, a gas-filled shape is fabricated from a membrane. The gas-filled shape may comprise an airship hull, and may be gas-tight. One or more fibers are applied to an outer surface of the gas-filled shape in a continuous manner such that a particular one of the one or more fibers wraps around a circumference of the gas-filled shape multiple times. The one or more fibers may be applied in any suitable manner. For example, in certain embodiments the one or more fibers may be applied to the outer surface of the gas-filled shape by suspending the gas-filled shape in the air and rotating the gas-filled shape during application of the one or more fibers. As another example, in certain embodiments the one or more fibers may be applied to the outer surface of the gas-filled shape using one or more fiber placement devices on the outer surface of the gas-filled shape, as described in detail below. In some cases, the one or more fibers may be applied in a helical pattern, such as a helical pattern having a helical angle within a range of 40 to 60 degrees when measured relative to a forward direction of the gas-filled shape. The applied one or more fibers are affixed to the outer surface of the gas-filled shape.

The various embodiments described herein may have one or more technical advantages. As one example, hulls constructed with continuous fiber reinforcement may be lighter than traditional designs. As another example, hulls constructed with continuous fiber reinforcement may be stronger than traditional designs. As still another example, hulls constructed with continuous fiber reinforcement may be easier to build than traditional designs.

Figure 1:
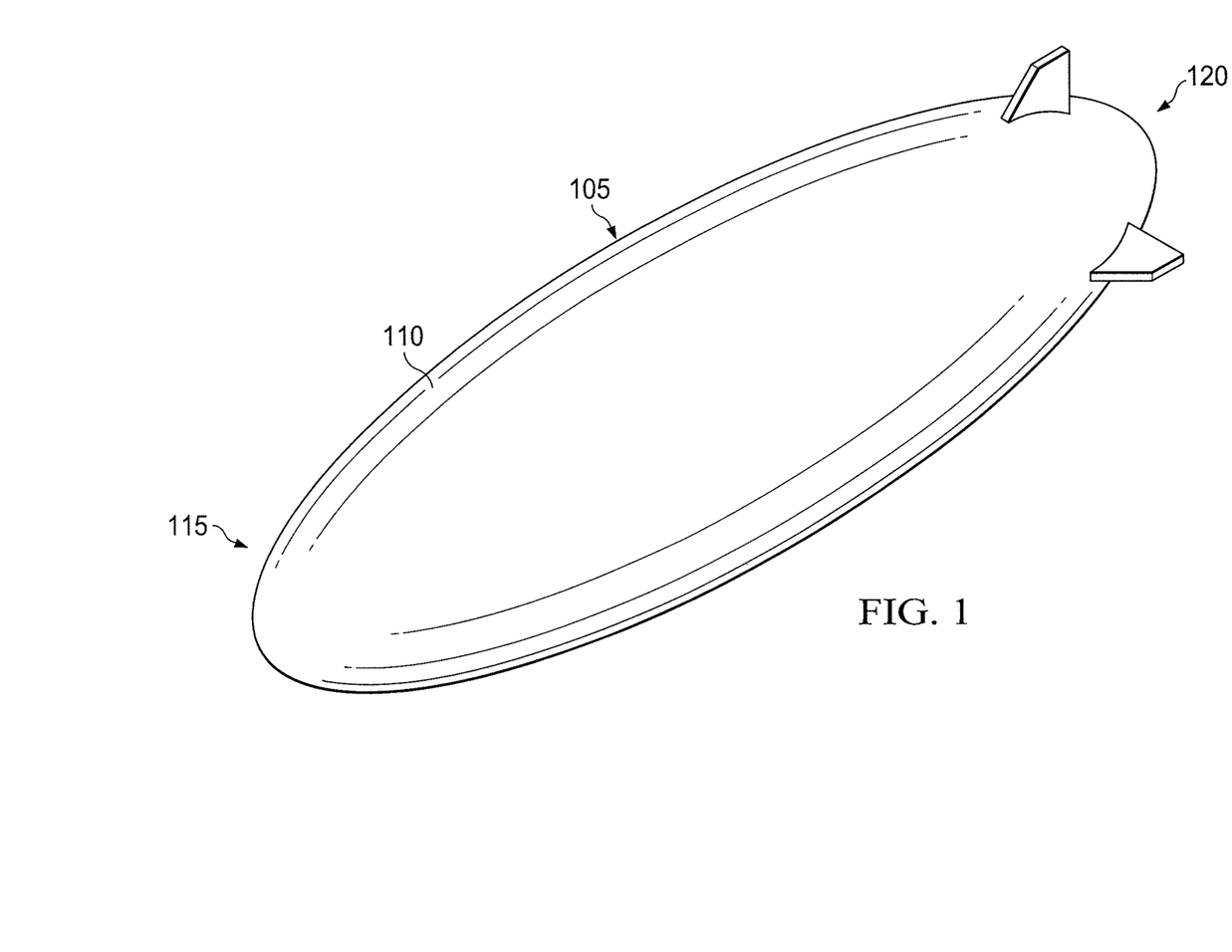
FIG. 1 illustrates an example of a gas-filled membrane, in accordance with certain embodiments.

FIG. 1 illustrates an example of a gas-filled membrane, in accordance with certain embodiments. More particularly, FIG. 1 illustrates a gas-filled membrane in the shape of an airship hull 105. Airship hull 105 is formed from a membrane 110, and has a first end 115 and a second end 120. Although airship hull 105 is shown in the example of FIG. 1 as having particular dimensions, the present disclosure contemplates that airship hull 105 may have any suitable dimensions.

Membrane 110 may be made from any suitable material, such as, for example, a high-performance film capable of creating a suitable gas barrier and providing protection from the environment. In some cases, membrane 110 may be formed from a single kind of material. In some cases, membrane 110 may be formed from a plurality of different materials. In certain embodiments, membrane 110 may be formed from MYLAR. In certain embodiments, membrane 110 may be treated with one or more resins, for example with a urethane resin.

Although the example of FIG. 1 illustrates gas-filled membrane 110 having the shape of airship hull 105, the present disclosure contemplates that membrane 110 may have any suitable shape. The various embodiments described herein are not limited to the example illustrated in FIG. 1.

As described above, membrane 110 may be formed from a film capable of creating a suitable gas barrier. This is desirable in that airships and aerostats, in order to function properly, must be able to retain the gasses with which they are filled. In some cases, the material from which membrane 110 is formed may vary depending on the type of gas intended to be used with membrane 110. The present disclosure contemplates that membrane 110 may be filled with any suitable gas. For example, in certain embodiments membrane 110 may be filled with helium.

Unlike existing approaches, which rely on a single fabric material to construct the airship hull piece by piece, membrane 110 is a lighter-weight film used to construct the gas-filled volume of airship hull 105. At this stage of the process, membrane 110 is not strong enough yet to support airship hull 105 in use, but it is sufficiently strong to hold the yield (i.e., gas) during the continuous fiber reinforcement process, described in detail below with respect to FIGS. 2-5.

Figure 2:
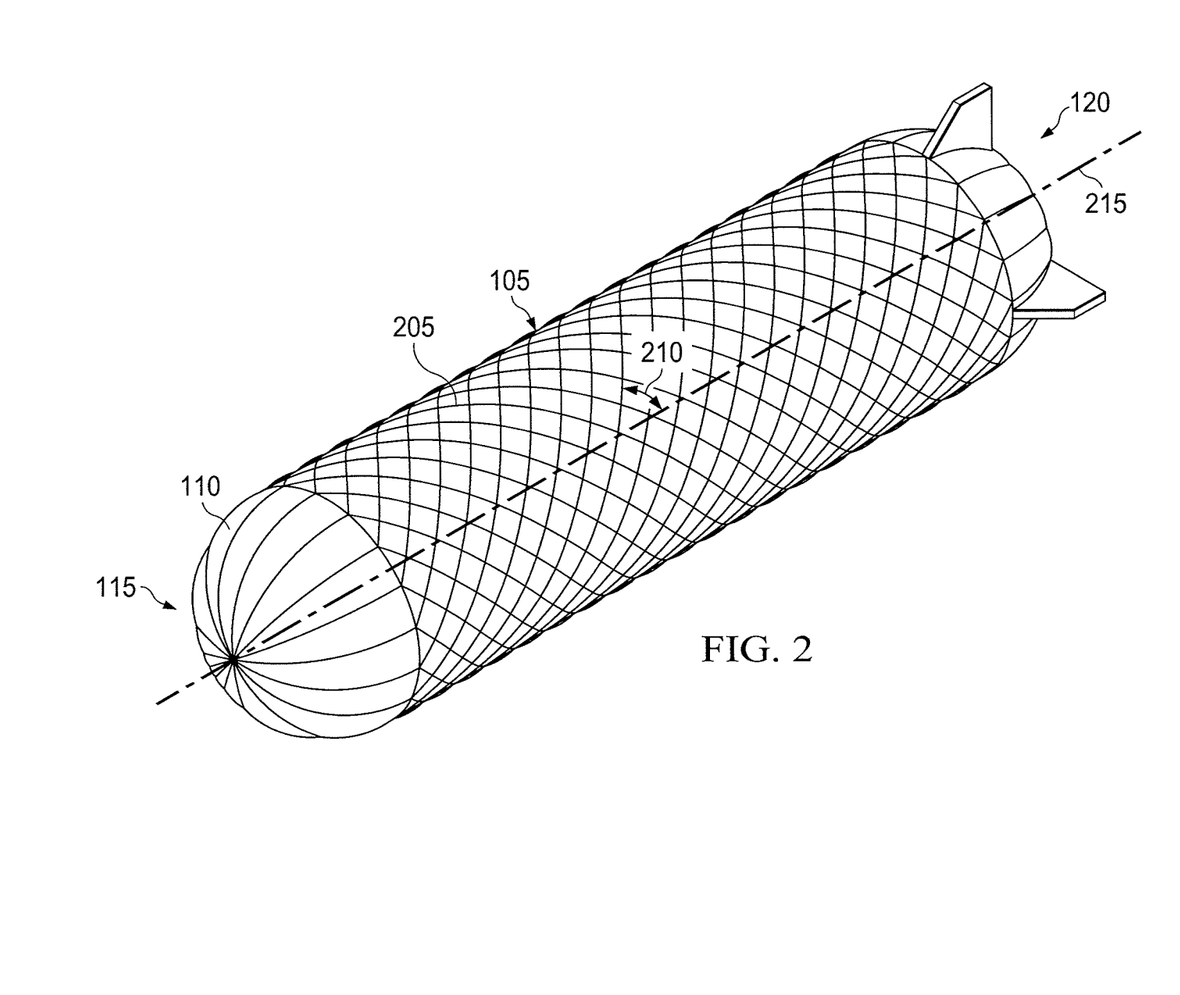
FIG. 2 illustrates an example of continuous fiber reinforcement of the gas-filled membrane of FIG. 1, in accordance with certain embodiments.

FIG. 2 illustrates an example of continuous fiber reinforcement of the gas-filled membrane of FIG. 1, in accordance with certain embodiments. Similar to FIG. 1, FIG. 2 illustrates airship hull 105 formed from membrane 110. In addition, FIG. 2 illustrates an example of airship hull 105 in which a fiber 205 has been applied in a continuous manner to reinforce membrane 110.

Fiber 205 may be formed from any suitable materials. In some cases, fiber 205 may be formed from a single material. In some cases, fiber 205 may be formed from a plurality of different materials. For example, in certain embodiments fiber 205 may be formed from one or more of polyester, aramid, polyethylene, carbon materials, one or more resins (e.g., urethane), and any other suitable material.

Fiber 205 may be applied in any suitable configuration. In certain embodiments, a single fiber 205 may be applied to the outer surface of membrane 110. In certain embodiments, multiple fibers 205 may be applied to the outer surface of membrane 110.

In certain embodiments, fiber 205 may be applied in a helical pattern. For example, as fiber 205 is wound around airship hull 105, fiber 205 may be applied continuously without stopping and starting again. Thus, in many cases a helical pattern emerges. In certain embodiments, fiber 205 is wound around the outer surface of membrane 110 in a helical pattern having a helical angle 210 relative to longitudinal axis 215 within the range of 40 to 60 degrees when measured relative to a forward direction of airship hull 105 (e.g., towards first end 115). In certain embodiments, helical angle 210 may be 54 degrees.

As shown in FIG. 2, fiber 205 may be anchored at one one or more ends of airship hull 105. In the example of FIG. 2, fiber 205 is anchored at first end 115 and at second end 120. Fiber 205 may be anchored in any suitable manner. For example, in certain embodiments a structure, such as a steel cable ring, may be coupled to first end 115 of airship hull 105, and fiber 205 may be attached to the structure, for example by tying the fiber to the structure. As another example, fiber 205 may be wound around the outer surface of membrane 110 until a particular target point is reached (e.g., the nose of airship hull 105 at first end 115) and then fiber 205 may be bonded to the outer surface of membrane 110. Fiber 205 may be bonded to the outer surface in any suitable manner. For example, fiber 205 may be bonded to the outer surface of membrane 110 using an adhesive or resin. In some cases, fiber 205 may only be bonded over a large enough distance to allow fiber 205 to be substantially anchored. In certain embodiments, once fiber 205 has been applied to airship hull 105, fiber 205 may be coated using a film or spray coating.

As described in detail below with respect to FIGS. 3 and 4, the application of fiber 205 may be performed in any suitable manner. For example, as described below with respect to FIG. 3, fiber 205 may be applied while airship hull 105 is suspended in the air. As another example, as described below with respect to FIG. 4, fiber 205 may be applied using one or more fiber placement devices.

Figure 3:
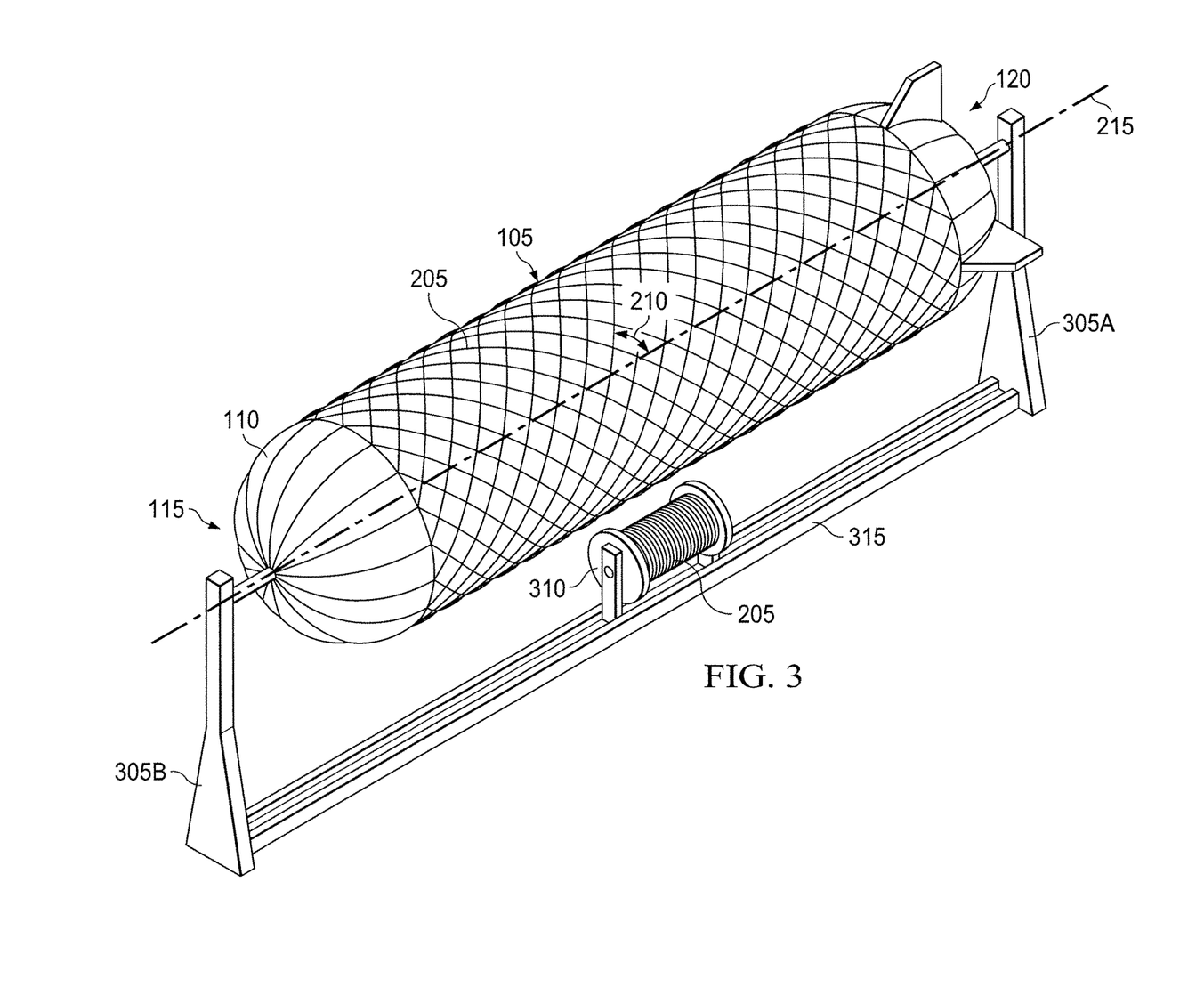
FIG. 3 illustrates an exemplary approach for applying continuous fiber reinforcement to the gas-filled membrane, in accordance with certain embodiments.

FIG. 3 illustrates an exemplary approach for applying continuous fiber reinforcement to the gas-filled membrane, in accordance with certain embodiments. Similar to FIG. 1 and described above, FIG. 3 illustrates airship hull 105 formed from membrane 110. Airship hull 105 has a first end 115 and a second end 120. In the example of FIG. 3, fibers have been applied to the outer surface of membrane 110 using continuous fiber reinforcement. FIG. 3 also illustrates additional elements that may be used in the process of continuous fiber reinforcement of airship hull 105, including supports 305A and 305B, a spool 310, and a track 315. Supports 305A, 305B, spool 310, and tracks 315 may be made of any suitable material and may have any suitable dimensions.

In the example embodiment of FIG. 3, supports 305A and 305B are located at opposite ends of airship hull 105. Supports 305A and 305B are configured to suspend airship hull 105 off the ground, for example during application of continuous fiber reinforcement. Support 305A is coupled to second end 120 of airship hull 105. Support 305B is coupled to first end 115 of airship hull 105. In certain embodiments, supports 305A and 305B may be rotatably coupled to second end 120 and first end 115, respectively, such that airship hull 105 can be rotated around its longitudinal axis 215 (similar to the action of a rotisserie). Rotation of airship hull 105 using supports 305A and 305B may be accomplished in any suitable manner. For example, in certain embodiments one or more of supports 305A and 305B may be fitted with a motor configured to rotate airship hull 105.

Spool 310 is coupled to track 315 in any suitable manner. For example, in certain embodiments spool 310 may be configured to engage with track 315 and move from its illustrated position toward first end 115 of airship hull 105 and toward second end 120 of airship hull 105, as and when required. Spool 310 may move along track 315 in any suitable manner. For example, in certain embodiments spool 310 may be equipped with a motor operable to propel spool 310 back and forth along track 315. The movement of spool 310 along track 315 may be controlled in any suitable manner. For example, in certain embodiments spool 310 may include appropriate hardware and/or software to allow the movements of spool 310 along track 315 to be controlled by a computer over a wired and/or wireless connection. As another example, the movement of spool 310 along track 315 may be controlled by an individual guiding spool 310 on track 315.

In the example of FIG. 3, spool 310 includes multiple layers of fiber 205. As described above, fiber 205 can be formed from any suitable material. For example, in certain embodiments fiber 205 may be formed from one or more of polyester, aramid, polyethylene, carbon materials, one or more resins (e.g., urethane), and any other suitable material. During the manufacturing process, fiber 205 may be wound onto spool 310. Spool 310 having fiber 205 may be fitted onto track 315 such that fiber 205 wound on spool 310 can be used for continuous fiber reinforcement of airship hull 105. In certain embodiments, spool 310 may be positioned relative to track 315 such that spool 310 can rotate (e.g., to dispense fiber 205) during movement along track 315.

Although FIG. 3 illustrates the use of spool 310, the present disclosure contemplates that any suitable device for dispensing fiber 205 may be used.

Although the example embodiment of FIG. 3 illustrates supports 305A and 305B coupled to track 315, other configurations are possible. For example, in certain embodiments track 315 may be a stand-alone piece separate from supports 305A and 305B. Track 315 may be made of any suitable materials. In some cases, the length of track 315 may be adjustable to suit the different lengths of various airship hulls 105.

In operation, supports 305A and 305B are rotatably coupled to second end 120 and first end 115, respectively, of airship hull 105. Meanwhile, spool 310 loaded with fiber 205 is coupled to track 315. A loose end of fiber 205 loaded onto spool 310 may be affixed to the outer surface of membrane 110. Rotation of airship hull 105 around its longitudinal axis 215 is initiated (for example, by turning on a motor associated with supports 305A and 305B). Coincident with the rotation of airship hull 105 around its longitudinal axis 215, spool 310 engaged with track 315 may begin to dispense fiber 205 as it moves along track 315. For example, assume that spool 310 begins moving from a point near second end 120 of airship hull 105 toward first end 115 of airship hull 105. As spool 310 moves toward first end 115, fiber 205 is dispensed from spool 310 and applied to the outer surface of membrane 110 as airship hull 105 rotates. Depending on certain factors (for example, the dimensions of the airship, the rate of movement of spool 310, and the rate of rotation of airship hull 105, fiber 205 may wrap around airship hull 105 multiple times as spool 310 moves toward first end 115.

Depending on particular implementations, spool 310 may move all the way to first end 115 of airship hull 105 before changing direction and traveling back toward second end 120 of airship hull 105. In certain embodiments, depending, for example, on the extent of continuous fiber reinforcement desired, spool 310 may travel less than the entire distance to first end 115 of airship hull 105 before traveling back toward second end 120 of airship hull 105. As spool 310 travels back toward second end 120 of airship hull 105, fiber 205 may continue to be dispensed. This process may be repeated until a desired degree of continuous fiber reinforcement has been achieved.

In certain embodiments, the size of spool 310 may accommodate a significant amount of fiber 205, such that a single spool 310 of fiber 205 may be used to provide continuous fiber reinforcement for airship hull 105. In some cases, the size of airship hull 105 may require more than one spool 310 of fiber 205 to be used. In such a scenario, when fiber 205 from a first spool 310 has been fully applied, the second loose end of fiber 205 may be affixed to membrane 110 of airship hull 105, for example using a suitable adhesive or form of mechanical anchoring. A second spool 310 may be loaded onto track 315 and the process may resume at the point where the first spool left off, continuing to apply fiber 205 to airship hull 105.

Fiber 205 may be applied in any suitable pattern. In certain embodiments, the rotation of airship hull 105 in combination with the movement of spool 310 along track 315 results the application of fiber 205 in a helical pattern. In certain embodiments, the helical angle 210 of the helical pattern of fiber 205 may have an angle between the range of 40 and 60 degrees. In certain embodiments, the helical angle 210 relative may be 54 degrees when measured relative to a forward direction of airship hull 105 (for example, toward one of first end 115 and second end 120).

Note that FIG. 3 merely illustrates one example embodiment for the application of continuous fiber reinforcement to airship hull 105. Other means of applying fiber 205 are possible, and are within the scope of the various embodiments described herein. For example, in an alternative embodiment a single support 305 may be used to suspend airship hull 105 such that first end 115 of airship hull 105 is coupled to support 305. Support 305 may be configured to suspend airship hull 105 above the ground, similar to a crane. Track 315, rather than running beneath airship hull 105 as depicted in the example of FIG. 3, may run vertically alongside suspended airship hull 105. In operation, such a configuration would result in a substantially similar application of fiber 205 to airship hull 105, with the application of fiber 205 by spool 315 as spool 315 moves along the length of airship hull 105 as airship hull 105 is rotated around its longitudinal axis 215. An additional method of applying continuous fiber reinforcement to airship hull 105 is described below with respect to FIG. 4.

Figure 4:
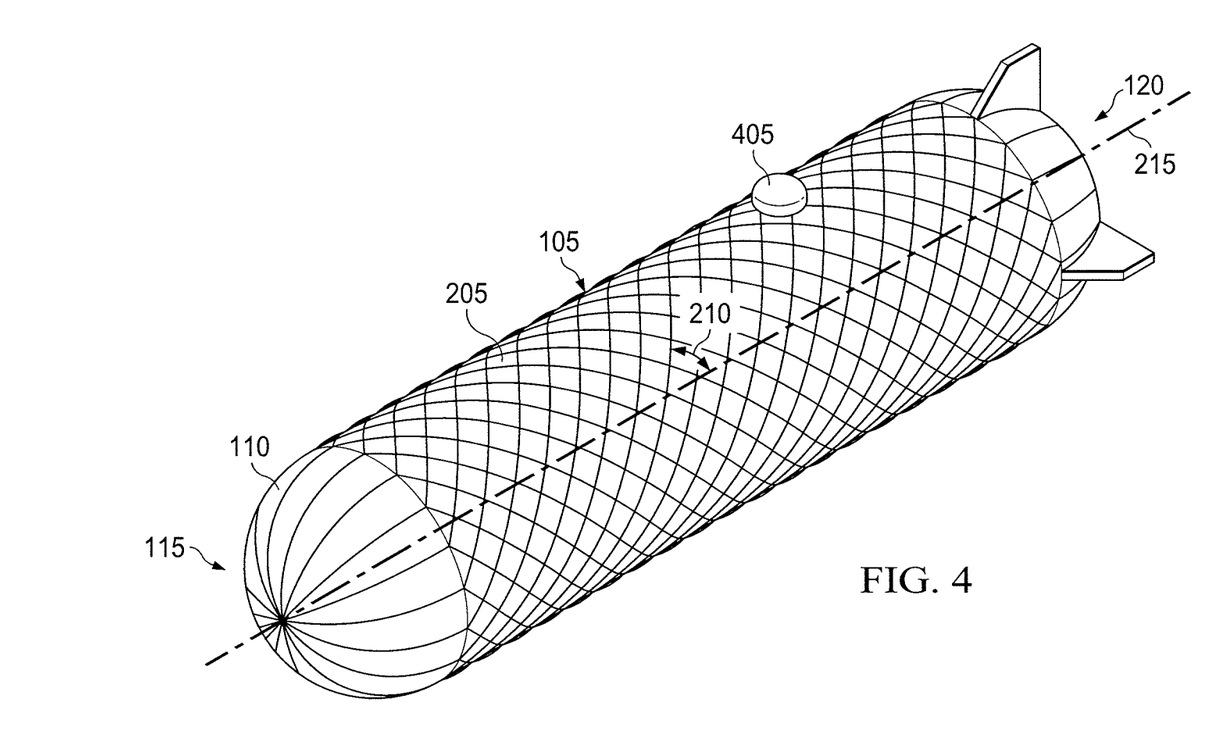
FIG. 4 illustrates another exemplary approach for applying continuous fiber reinforcement to the gas-filled shape, in accordance with certain embodiments.

FIG. 4 illustrates another exemplary approach for applying continuous fiber reinforcement to the gas-filled shape, in accordance with certain embodiments. Like FIGS. 2-3 described above, FIG. 4 illustrates airship hull 105 formed from membrane 110. One or more fibers 205 have been applied to airship hull 105 (more specifically, to the outer surface of membrane 110) from first end 115 to second end 120 of airship hull 105.

In the example embodiment described above with respect to FIG. 3, fiber 205 were applied by rotating airship hull 105 to allow fiber 205 to be applied multiple times around the circumference of airship hull 105. There may, however, be instances in which it is not practical to suspend and rotate airship hull 105. For example, in some cases the size of airship hull 105 may be so large that it is no longer desirable to apply the continuous fiber reinforcement in such a manner.

In certain embodiments, such as the example illustrated in FIG. 4, fiber 205 may be applied using a fiber placement device 405. Fiber placement device 405 may be any suitable system capable of traversing the surface of membrane 110 forming airship hull 105 to apply one or more fibers 205. For example, in certain embodiments fiber placement device 405 may be a self-propelled device that travels on the surface of membrane 110, such as the airship hull repair system described in U.S. Pat. No. 8,800,628, which is hereby incorporated by reference in its entirety.

In certain embodiments, fiber placement device 405 may be configured to move across airship hull 105 (or the hull of a similar craft, such as a dirigible, blimp, hybrid airship, aerostat, or other lighter-than-air craft). Fiber placement device 405 may include an exterior piece configured to move on the outer surface of membrane 110 and an interior piece configured to move on an interior of membrane 110. In some cases, a magnetic coupling couples the exterior piece to the interior piece so that the pieces move together. The magnetic coupling can include at least one magnet in each of the exterior piece and the interior piece. In other aspects, the magnetic coupling can include at least one magnet in one of the pieces and a magnetically active material in the other one of the pieces. The magnets can be permanent magnets or electromagnets. Any other type of magnetic coupling can be used.

Each piece of fiber placement device 405 includes a mechanism permitting motion across membrane 110. As one example, fiber placement device 405 may include wheels for the exterior piece and wheels for the interior piece. However, the disclosure is not limited to wheels. For example, in certain embodiments fiber placement device 405 may use rollers, tracks, balls, or any other type of mechanism that permits motion across membrane 110.

In certain embodiments, fiber placement device 405 may include a power source, a drive subsystem, a damage detecting subsystem, a hull repair subsystem, a positioning subsystem, a damage reporting subsystem, and/or a control subsystem. In alternative aspects, fewer than all of these elements can be included, and additional elements can be included as well. The power source provides power for the subsystems that require power. In addition, if the magnetic coupling of the interior piece includes one or more electromagnets, then the power source can provide power for those electromagnets.

The drive subsystem is configured to move fiber placement device 405 across airship hull 105. In certain embodiments, the drive subsystem directly drives the interior piece across the interior of membrane 110. The movement of the interior piece in turn moves the exterior piece by virtue of the magnetic coupling between the pieces. In addition, this magnetic coupling allows the interior piece to move across the top and sides of the hull including while inverted. In other aspects, the drive subsystem can be included in the exterior piece.

The positioning subsystem can include accelerometers that determine the location of fiber placement device 405 based on movement of the system. In certain embodiments, the positioning subsystem can include a transmitter and receiver, with the position of the system triangulated by an external locator system based on transmitted signals and then transmitted back to the positioning subsystem. For yet another example, the positioning subsystem can include a video camera that shows an area surrounding fiber placement device 405. Images from the video camera can be viewed by an operator to determine a position of the system. Any other form of positioning subsystem can be used, alone or in conjunction with some or all of these examples.

Fiber placement device 405 may be outfitted with a fiber dispenser, such as a spool similar to spool 315 described above with respect to FIG. 3, to allow fiber placement device 405 to dispense fiber 205 during application of continuous fiber reinforcement to airship hull 105. The exterior piece and interior piece of fiber placement device 405 may include various other pieces. For example, fiber placement device 405 may have an interior and exterior cover to protect fiber placement device 405 and function as an aerodynamic faring.

The application of fiber 205 using fiber placement device 405 takes place much as described above with respect to FIG. 3. A loose end of fiber 205 loaded onto a fiber dispenser associated with fiber placement device 405 may be affixed to the outer surface of membrane 110. Fiber placement device 405, propelled by the drive subsystem traverses the outer surface of membrane 110 (guided, for example, by the positioning subsystem described above). As fiber placement device 405 traverses the surface of airship hull 105, a spool (similar to spool 310 described above with respect to FIG. 3) dispenses fiber 205 on the outer surface of membrane 110. Fiber 205 may be applied in any suitable pattern. In certain embodiments, the movement of fiber placement device 405 across the outer surface of membrane 110 results in the application of fiber 205 in a helical pattern. In certain embodiments, the helical angle 210 relative to longitudinal axis 215 of the helical pattern of fiber 205 may have an angle between the range of 40 and 60 degrees. In certain embodiments, the helical angle 210 may be 54 degrees when measured relative to a forward direction of airship hull 105 (for example, toward one of first end 115 and second end 120).

Although FIG. 4 illustrates a single fiber placement device 405, the present disclosure contemplates that any suitable number of fiber placement devices 405 could be used in the continuous fiber reinforcement of airship hull 105. For example, in certain embodiments multiple fiber placement devices 405 could travel around airship hull 105 simultaneously, and thereby build up an airship hull fairly quickly. In such a scenario, multiple fibers 205 may be applied to the outer surface of membrane 110. Once fiber placement devices 405 have finished applying fibers 205, the fibers may be glued in place (or otherwise anchored) and a film or spray coating may be applied on the outer surface to encapsulate fibers 205. This may advantageously protect the applied fiber 205 from the environment.

As shown above, the present disclosure contemplates flexibility in the manner in which fiber 205 is applied to the outer surface of membrane 110. In addition to contemplating a variety of ways to apply fiber 205, the present disclosure contemplates that fiber 205 may be applied in any suitable amount. For example, in certain embodiments fiber 205 can be wound sparsely around airship hull 105 with only a small amount of fiber 205 being applied. Alternatively, a much larger amount of fiber 205 can be applied, for example by allowing the systems described above with respect to FIGS. 3 and 4 to run for longer periods of time.

Figure 5:
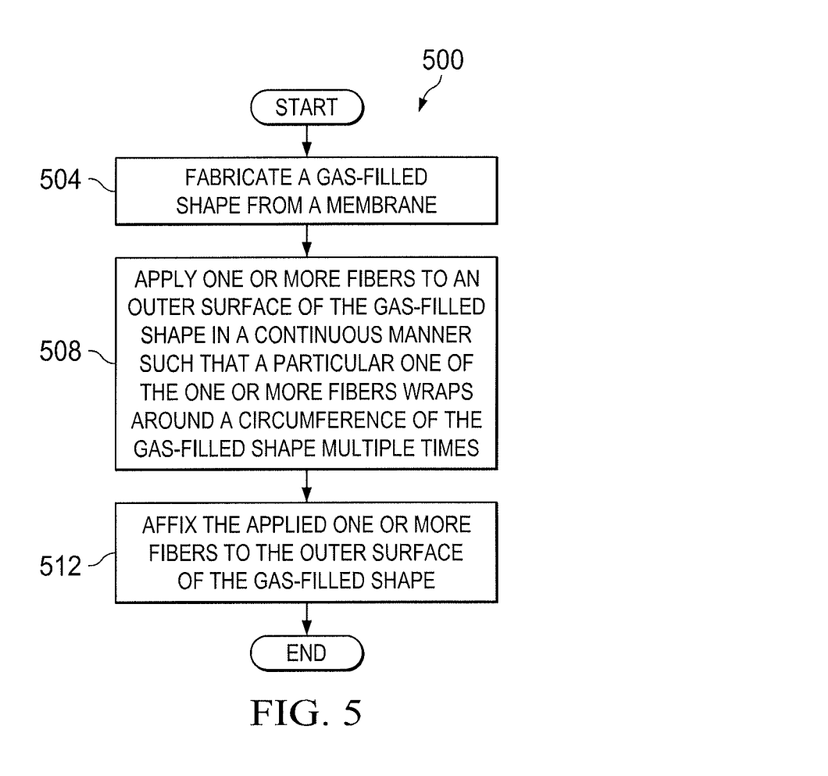
FIG. 5 is a flow diagram of a method for continuous fiber reinforcement of airship construction, in accordance with certain embodiments.

FIG. 5 is a flow diagram of a method 500 for continuous fiber reinforcement of airship construction, in accordance with certain embodiments. Method 500 begins at step 504, where a gas-filled shape is fabricated from a membrane. In certain embodiments, the gas-filled shape may comprise an airship hull. The gas-filled shape fabricated from the membrane may be gas-tight.

At step 508, one or more fibers are applied to an outer surface of the gas-filled shape in a continuous manner such that a particular one of the one or more fibers wraps around a circumference of the gas-filled shape multiple times. In certain embodiments, applying one or more fibers to the outer surface of the gas-filled shape may comprise: suspending the gas-filled shape in the air; and rotating the gas-filled shape during application of the one or more fibers. In certain embodiments, applying one or more fibers to the outer surface of the gas-filled shape may comprise: positioning at least one fiber placement device on the outer surface of the gas-filled shape, the fiber placement device coupled across the membrane to an internal component and comprising a fiber dispenser for dispensing the one or more fibers; and applying the one or more fibers to the outer surface of the gas-filled shape using the at least one fiber placement device, wherein the fiber placement device is configured to travel along the outer surface of the membrane. In some cases, method 500 may comprise applying the one or more fibers to the outer surface of the gas-filled shape using a plurality of fiber placement devices. The fiber placement device may be self-propelled. The fiber placement device may be coupled across the membrane to the internal component using magnetic attraction.

In certain embodiments, applying one or more fibers to the outer surface of the gas-filled shape in a continuous manner may comprise applying the one or more fibers in a helical pattern, the helical pattern having a helical angle within a range of 40 to 60 degrees when measured relative to a forward direction of the gas-tight shape.

At step 512, the applied one or more fibers are affixed to the outer surface of the gas-filled shape. In certain embodiments, affixing the applied one or more fibers to the exterior surface of the gas-filled shape may comprise mechanically anchoring the one or more fibers to an end of the gas-filled shape. In some cases, the one or more fibers are affixed to the exterior surface of the gas-filled shape using polyimide tape.

In certain embodiments, method 500 may comprise coating the one or more fibers applied to the gas-filled shape using a film or spray coating.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. An airship hull, comprising:
a gas-filled shape fabricated from a membrane;
one or more fibers applied to an outer surface of the gas-filled shape in a continuous manner such that a particular one of the one or more fibers wraps around a circumference of the gas-filled shape multiple times, wherein the applied one or more fibers are:
applied in a helical pattern, the helical pattern having a helical angle within a range of 40 degrees to 60 degrees when measured relative to a forward direction of the gas-filled shape;
affixed to the outer surface of the gas-filled shape using polyimide tape;
mechanically anchored to an end of the gas-filled shape; and
coated with one of a film or spray coating.

2. The airship hull of claim 1, wherein the gas-filled shape fabricated from the membrane is gas-tight.

3. A method, comprising:
fabricating an airship hull comprising a gas-filled shape formed from a membrane;
suspending the gas-filled shape in the air;
applying one or more fibers to an outer surface of the gas-filled shape in a continuous manner such that a particular one of the one or more fibers wraps around a circumference of the gas-filled shape multiple times, wherein the one or more fibers are mechanically anchored to an end of the gas-filled shape; and
affixing the applied one or more fibers to the outer surface of the gas-filled shape.

4. The method of claim 3, wherein the gas-filled shape formed from the membrane is gas-tight.

5. The method of claim 3, further comprising:
rotating the gas-filled shape during application of the one or more fibers.

6. The method of claim 3, further comprising coating the one or more fibers applied to the gas-filled shape using a film or spray coating.

7. The method of claim 3, wherein the one or more fibers are affixed to the outer surface of the gas-filled shape using polyimide tape.

8. The method of claim 3, wherein applying one or more fibers to the outer surface of the gas-filled shape in a continuous manner comprises:
applying the one or more fibers in a helical pattern, the helical pattern having a helical angle within a range of 40 to 60 degrees when measured relative to a forward direction of the gas-filled shape.

9. The method of claim 3, wherein applying one or more fibers to the outer surface of the gas-filled shape comprises:
positioning at least one fiber placement device on the outer surface of the gas-filled shape, the fiber placement device coupled across the membrane to an internal component and comprising a fiber dispenser for dispensing the one or more fibers; and
applying the one or more fibers to the outer surface of the gas-filled shape using the at least one fiber placement device, wherein the fiber placement device is configured to travel along the outer surface of the membrane.

10. The method of claim 9, comprising:
applying the one or more fibers to the outer surface of the gas-filled shape using a plurality of fiber placement devices.

11. The method of claim 9, wherein the fiber placement device is self-propelled.

12. The method of claim 9, wherein the fiber placement device is coupled across the membrane to the internal component using magnetic attraction.

13. An airship hull, comprising:
a gas-tight shape fabricated from a membrane; and
one or more fibers applied to an outer surface of the gas-tight shape in a continuous manner such that a particular one of the one or more fibers wraps around a circumference of the gas-tight shape multiple times, wherein the applied one or more fibers are:
affixed to the outer surface of the gas-tight shape using polyimide tape; and
mechanically anchored to an end of the gas-tight shape.

14. The airship hull of claim 13, wherein the one or more fibers applied to the gas-tight shape are coated with one of a film or spray coating.

15. The airship hull of claim 13, wherein the one or more fibers are applied in a helical pattern, the helical pattern having a helical angle of 40 to 60 degrees when measured relative to a forward direction of the gas-tight shape.

* * * * *